(12) United States Patent
Chai et al.

(10) Patent No.: US 9,639,997 B2
(45) Date of Patent: May 2, 2017

(54) TEST APPARATUS AND TEST METHOD BASED ON DFDAU

(71) Applicant: Air China Limited, Beijing (CN)

(72) Inventors: Weixi Chai, Beijing (CN); Dechao Zhong, Beijing (CN); Xueliang Wu, Beijing (CN); Tang Li, Beijing (CN); Yuanbin Li, Beijing (CN); Qixiang Li, Beijing (CN); Chengli Ouyang, Beijing (CN); Wenjing Bi, Beijing (CN)

(73) Assignee: Air China Limited, Beijing (CN)

( * ) Notice: Subject to any disclaimer, the term of this patent is extended or adjusted under 35 U.S.C. 154(b) by 110 days.

(21) Appl. No.: 14/284,017

(22) Filed: May 21, 2014

(65) Prior Publication Data

US 2014/0350780 A1    Nov. 27, 2014

(30) Foreign Application Priority Data

May 22, 2013  (CN) .......................... 2013 1 0191378
May 22, 2013  (CN) .......................... 2013 1 0191379

(51) Int. Cl.
| | | |
|---|---|---|
| G07C 5/08 | (2006.01) | |
| B64D 45/00 | (2006.01) | |
| G05D 1/00 | (2006.01) | |
| H04B 3/46 | (2015.01) | |

(52) U.S. Cl.
CPC .......... G07C 5/0816 (2013.01); B64D 45/00 (2013.01); G05D 1/0055 (2013.01); H04B 3/46 (2013.01)

(58) Field of Classification Search
None
See application file for complete search history.

(56) References Cited

U.S. PATENT DOCUMENTS

| | | | | |
|---|---|---|---|---|
| 4,155,116 A | * | 5/1979 | Tawfik | ............... G05B 23/0256 |
| | | | | 701/32.8 |
| 4,454,588 A | * | 6/1984 | O'Brien | .................. G06F 11/22 |
| | | | | 702/122 |
| 4,470,116 A | * | 9/1984 | Ratchford | ............ G05D 1/0055 |
| | | | | 701/33.4 |

(Continued)

FOREIGN PATENT DOCUMENTS

| | | |
|---|---|---|
| CN | 101342946 A | 1/2009 |
| CN | 101700810 A | 5/2010 |

(Continued)

OTHER PUBLICATIONS

Furse, Cynthia; Down to the Wire; Feb. 2001; IEEE Spectrum; vol. 38 Issue 2; http://ieeexplore.ieee.org/stamp/stamp.jsp?tp=&arnumber=898797.*

(Continued)

*Primary Examiner* — John R Olszewski
*Assistant Examiner* — David Merlino
(74) *Attorney, Agent, or Firm* — Brundidge & Stanger, P.C.

(57) ABSTRACT

The present invention relates to a test apparatus that includes a simulation signal generation portion and a test portion. Embodiments of the simulation signal generation portion include an input interface, a simulation signal generation module, and an output interface. Embodiments of the test portion include wiring extension apparatus, a Digital Flight Data Acquisition Unit and a comparison module.

26 Claims, 13 Drawing Sheets

(56) References Cited

U.S. PATENT DOCUMENTS

| | | | | |
|---|---|---|---|---|
| 4,782,292 | A * | 11/1988 | Gilfoy | G05B 23/0235 324/73.1 |
| 5,023,791 | A * | 6/1991 | Herzberg | G05B 23/0283 701/33.4 |
| 5,260,874 | A * | 11/1993 | Berner | G09B 9/24 701/32.8 |
| 8,000,844 | B2 * | 8/2011 | Mottura | G05D 1/0055 701/34.3 |
| 8,423,305 | B2 * | 4/2013 | Thomas | G01R 31/024 345/440 |
| 2003/0215128 | A1 | 11/2003 | Thompson | |
| 2004/0046570 | A1 | 3/2004 | Teich | |
| 2011/0043369 | A1 | 2/2011 | Knoop | |
| 2011/0169498 | A1 | 7/2011 | Shipley | |
| 2014/0029654 | A1 * | 1/2014 | Thompson | H04B 3/46 375/222 |
| 2015/0227647 | A1 * | 8/2015 | Shelton | G06F 17/5009 703/13 |

FOREIGN PATENT DOCUMENTS

| | | |
|---|---|---|
| CN | 102092477 A | 6/2011 |
| CN | 103065022 A | 4/2013 |
| EP | 0100746 A2 | 2/1984 |

OTHER PUBLICATIONS

Extended European Search Report from application No. 14169533.8 mailed Oct. 15, 2015.

* cited by examiner

TEST APPARATUS AND TEST METHOD BASED ON DFDAU

TECHNICAL FIELD

The present invention relates to the field of aviation technology, in particular to a test apparatus and method based on digital flight data acquisition unit (DFDAU).

BACKGROUND ART

In order to monitor and analyze aircraft condition, a large number of sensors are mounted on the aircraft. Those sensors are used to detect and collect massive data of aircraft condition such as acceleration, air speed, altitude, airfoils configurations, external temperature, cabin temperature and pressure, engine performance and so on. Those data of aircraft condition play a very important role in flight safety.

When an aircraft malfunctions, data of aircraft condition reflecting operating status of an aircraft will be abnormal. Various reasons contribute to the malfunction of an aircraft. Therefore, sometimes it is difficult to locate malfunction of an aircraft. Specifically, malfunction might occur to component of aircraft itself, to sensors, and also to signal transmission device for transmitting data of aircraft condition measured by sensors.

On the other hand, malfunction also might occur to control system of an aircraft. Control system of an aircraft receives control command, converts the control command into control signals and transmits the control signals to components of the aircraft, and then components of the aircraft perform corresponding actions. It is also difficult to locate malfunction of operating system of an aircraft. Specifically, malfunction might occur to moving parts of an aircraft, to control command input device, and also to control signal transmitting device. In certain cases, malfunction also might occur to DFDAU (Digital Flight Data Acquisition Unit).

As far as the location of malfunctions of an aircraft is concerned, the location of malfunction may be accelerated if the possibility that malfunction might occur to a signal transmission device or DFDAU can be eliminated. In prior art, there is no such instrument specifically for testing a signal transmission device or DFDAU. In many cases, it is required to disassemble an aircraft so as to complete the test of a signal transmission device. Besides, since the type of measuring signals and control signals in an aircraft is very complicated, the test of a signal transmission device of an aircraft also becomes complicated and difficult. Therefore, there is a need in the art a test apparatus and method specific to signal transmission device or DFDAU of an aircraft.

SUMMARY

For technical problems in prior art, there is provided, according to one aspect of the present invention, a test apparatus based on DFDAU (Digital Flight Data Acquisition Unit), comprising: a simulation signal generation portion; and a test portion; wherein, the simulation signal generation portion comprises: an input interface, which receives test data; a simulation signal generation module, which generates simulation signal according to the test data; and an output interface, which is adaptive to be connected to one end of one or more signal transmission devices to be tested and output the simulation signal; wherein the test portion comprises: a wiring extension apparatus, which is used to form a gating wiring apparatus, and is adaptive to be connected to the other end of the one or more signal transmission devices to be tested and receive the simulation signal passing through the one or more signal transmission devices to be tested; DFDAU, which is adaptive to receive simulation signal from the wiring extension device and obtain transmitted test data; a comparison module, which is adaptive to compare the test data and transmitted test data.

According to another aspect of the present invention, there is provided a test method of aircraft signal transmission device, comprising: connecting one end of one or more signal transmission devices to be tested to an output interface of the simulation signal generation portion of the above test apparatus, connecting the other end of one or more signal transmission devices to be tested to a wiring extension device of the test portion of the above test apparatus; loading test data onto the above test apparatus; generating simulation signal according to the test data; receiving simulation signal from the wiring extension device; comparing the test data from input to input interface and test data based on simulation signal from the wiring extension device.

According to another aspect of the present invention, there is provided a test apparatus of aircraft DFDAU, comprising: an input interface, which receives test data; a simulation signal generation module, which generates simulation signal according to the test data; a wiring extension device, which is used to form a gating wiring apparatus, wherein the simulation signal enters into DFDAU to be tested via the wiring extension apparatus; and a comparison module, which compares test data based on the simulation signal from the DFDAU to be tested and test data from input to the input interface.

According to another aspect of the present invention, there is provided a method for testing the DFDAU to be tested on the above DFDAU test apparatus, comprising: loading test data onto the test apparatus; generating simulation signal according to the test data; connecting the simulation signal into a wiring extension device; receiving simulation signal from the wiring extension device and connecting the simulation signal into the DFDAU to be tested; comparing the test data based on the simulation signal from the DFDAU to be tested and the test data loaded into the test apparatus.

DESCRIPTION OF DRAWINGS

The preferred embodiments of the present invention will be described below with further details, taken in conjunction with drawings, wherein.

EMBODIMENTS

In order to present a clearer picture of the purposes, technical solutions and merits of the present invention, the technical solutions in the embodiments of the present invention will be further described, taken in conjunction with the drawings in the embodiments of the present invention. Obviously, the described embodiments are only a part of rather than all of the embodiments of the present invention. Based on the embodiments of the present invention, all other embodiments that persons skilled in the art obtained without paying any creative effort shall fall within the protection scope of the present invention.

The "aircraft signal transmission device" refers to a signal transmission device used to transmit signals reflecting aircraft condition from each sensor or other device on an aircraft and control signals from control system or other device. Transmitted signals comprise but are not limited to on/off signal, quiescent voltage signal, analog signal and/or bus signal. Aircraft signal transmission device comprises but is not limited to wired transmission device, such as coaxial cable, communication cable and complex cable.

The present invention achieves the test of aircraft signal transmission device via a test apparatus comprising a simulation signal generator and DFDAU. According to one embodiment of the present invention, test apparatus comprises a signal generation portion containing the simulation signal generator and a test portion containing DFDAU, which may be separated from each other. Since DFDAU may record all data of aircraft condition and control command, the test apparatus of aircraft signal transmission device based on DFDAU of the present invention can be applied in all aircraft signal transmission devices, and there is no need to provide a separate processing apparatus corresponding to a certain type of aircraft signal transmission device.

Figure 1:
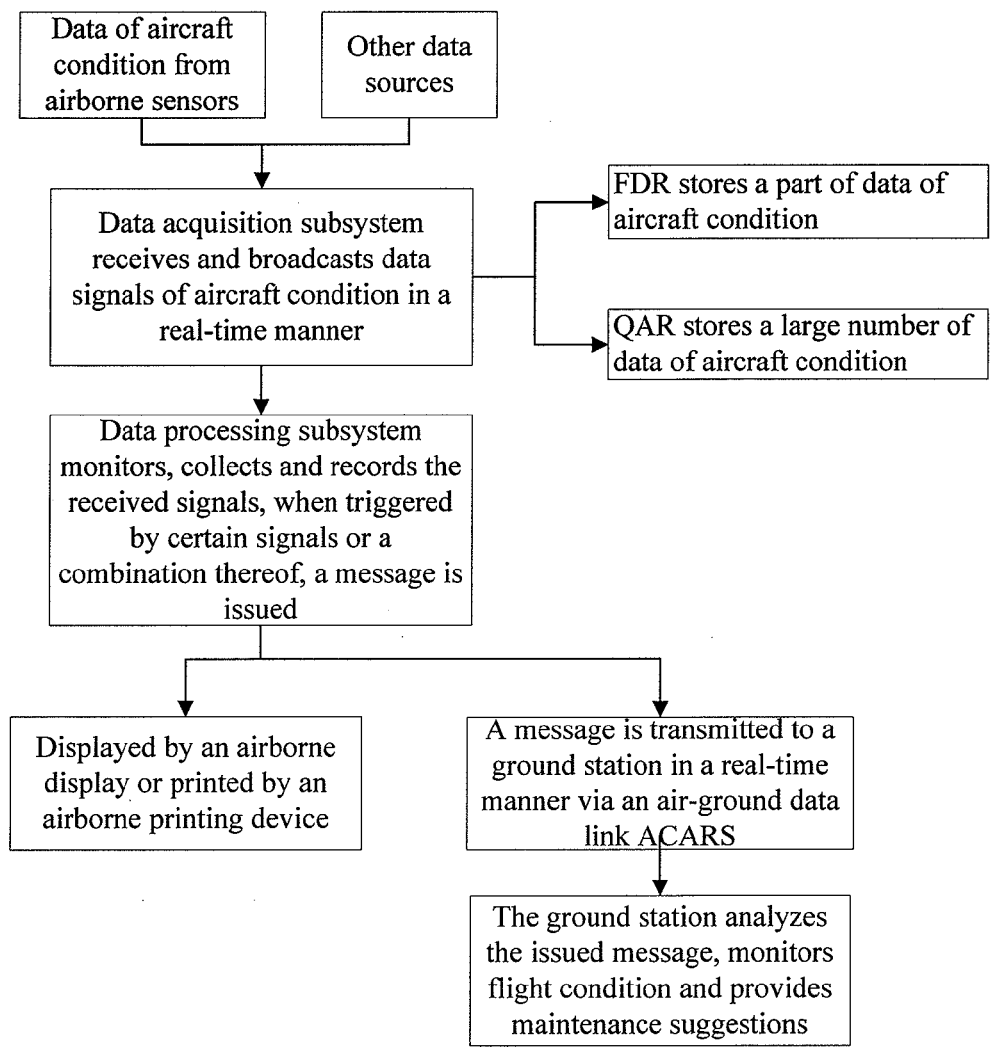
FIG. 1 is a schematic of a DFDAU working environment according to one embodiment of the present invention.

FIG. 1 is a schematic of a DFDAU working environment according to one embodiment of the present invention. The core component in an aircraft for collecting and processing data of aircraft condition is DFDAU (Digital Flight Data Acquisition Unit).

DFDAU is an integrated airborne data acquisition and processing system. DFDAU comprises a data acquisition subsystem, which is used for collecting real-time data of aircraft condition from each sensor on the aircraft, and converting the obtained data into digital signal and storing the same into QAR (Quick Access Recorder), a data recorder of aircraft condition.

DFDAU also comprises a data processing subsystem, such as ACMS (Aircraft Condition Monitoring System). ACMS is capable of monitoring aircraft condition according to data collected by DFDAU in a real-time manner. When a certain trigger logic is satisfied, ACMS generates a corresponding message containing certain data of aircraft condition. The message can be displayed by an airborne display, printed by an airborne printing device, or stored in a data disk to be used by flight crew or maintenance personnel during a stopover or after a flight. The message can also be sent to the SITA ground receiving station through a device such as very high frequency, high frequency and satellite transceiver via an airborne ACARS (Aircraft Communication Addressing and Reporting System), and transmitted to a terminal computer of an airline company.

DFDAU (Digital Flight Data Acquisition Unit) receives data of aircraft condition from airborne sensors or other devices. The data acquisition subsystem of DFDAU converts the obtained data of aircraft condition into digital signal for broadcasting. QAR (Quick Access Recorder) receives and stores the broadcast data of aircraft condition. Among them, a part of the data is stored in FDR (Flight Data Recorder), namely the "Black Box", so as to be analyzed by relevant personnel after an emergency occurred.

The test apparatus of the present invention utilize simulation signal to test an aircraft signal transmission device to be tested. Those simulation signals may be simulation data of condition composed according to aircraft data criterion and also may be real data of aircraft condition from QAR. Since, the test environment on the test apparatus of the present invention is totally the same with aircraft environment, the reliability of the test is guaranteed.

As far as the test for an aircraft signal transmission device is concerned, according to one embodiment of the present invention, simulation signal generated by test apparatus is connected to an input end of the aircraft signal transmission device to be tested, and output end of the aircraft signal transmission device to be tested is connected to DFDAU of the test apparatus, and whether an aircraft signal transmission device runs well can then be determined by comparing data of aircraft condition or control signal used for generating simulation signal with the data of aircraft condition or control signal broadcast by data acquisition subsystem of DFDAU.

ACMS (Aircraft Condition Monitoring System) of DFDAU also receives broadcast data of aircraft condition from data acquisition subsystem of DFDAU. ACMS monitors, collects and records data of aircraft condition, and outputs predetermined data of aircraft condition under certain trigger condition so as to be used for flight crew and maintenance personnel to monitor condition and performance of aircraft. It is referred to as message since its data content and format can be changed by users.

ACMS message is generated under the control of integrated application software. A message is triggered by threshold of certain parameters of aircraft condition or combinational logics of multiple certain parameters of aircraft condition, namely, certain message trigger logic. The ACMS message generated by the message trigger logic designed and tested by producers of ACMS is referred to basic message. Many basic messages have already become a standard stipulated by civil aviation administrative department. Taking Boeing 737NG aircraft as an example, the ACMS basic messages it uses are about 20 messages.

Customized messages can be produced by composing ACMS message trigger logics by oneself. Customized messages may allow persons skilled in the art get rid of the limitation of parameters in basic messages, and directly deal with thousands of parameters of aircraft condition.

As far as the test of aircraft signal transmission device is concerned, according to one embodiment of the present invention, a customized message trigger logic is composed for an aircraft signal transmission device to be tested. After a corresponding message is obtained, whether an aircraft signal transmission device runs well can then be determined by comparing data of aircraft condition or control signal data in the message with data of aircraft condition or control signal data broadcast by data acquisition subsystem in DFDAU.

The test apparatus of the present invention utilize simulation signal to test a message trigger logic composed by oneself. Those simulation signals may be real data of aircraft condition, in particular data of aircraft condition retrieved from QAR after a flight, through which the real aircraft condition can be "reproduced". Since the test environment on the test apparatus of the present invention is completely identical to environment in an aircraft, the reliability of the test is guaranteed.

QAR data are often used in analysis and statistics of flight condition of aircraft, and may also provide a data source for various tests. Therefore, QAR data are also feasible data for the test. On the other hand, data of aircraft condition composed according to aircraft data criterion can also become available test data. As such, one can compose data of aircraft condition specific to a certain event, and perform a test under a certain event without having to wait for the real occurrence of the specific event. As a result, the test will be more convenient and efficient.

Figure 2:
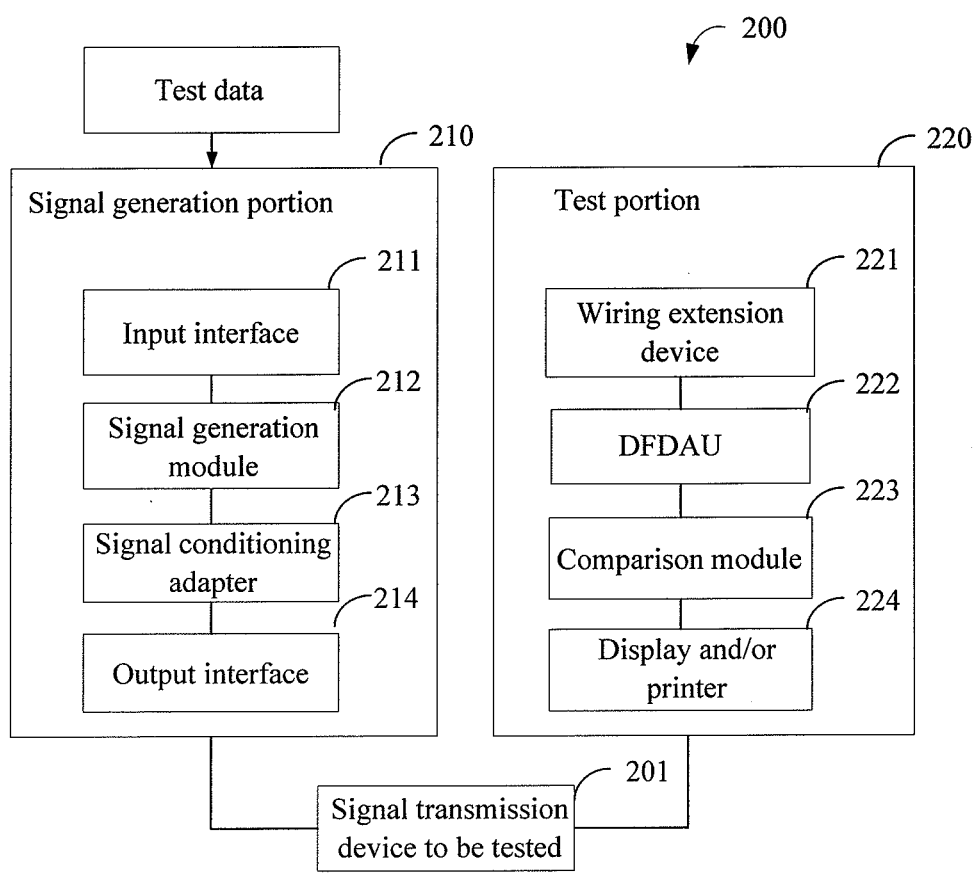
FIG. 2 is a structural schematic of a test apparatus for testing a signal transmission device according to one embodiment of the present invention.

FIG. 2 is a structural schematic of a test apparatus for testing an aircraft signal transmission device according to one embodiment of the present invention.

According to one embodiment of the present invention, test apparatus 200 comprises a simulation signal generation portion 210 and a test portion 220 containing DFDAU. Simulation signal generation portion 210 and test portion 220 containing DFDAU can be separated from each other.

According to one embodiment of the present invention, simulation signal generation portion 210 comprises an input interface 211, a simulation signal generation module 212 and an output interface 214.

Input interface 211 of the simulation signal generation portion is used to input data of aircraft condition. According to one embodiment of the present invention, input interface 211 may be bus interface, wired network interface, USD interface, wireless network interface, Bluetooth interface and so forth. Persons skilled in the art shall appreciate that any means that can realize data input may be used for the configuration of input interface of the test apparatus.

According to one embodiment of the present invention, data source for testing an aircraft signal transmission device comprises two types: one is simulation data of aircraft condition or control command data composed according to aircraft data criterion, and the other is data of aircraft condition or control command data stored on airborne QAR (Quick Access Recorder).

The occurrence of various events can be better simulated and reproduced by using simulation data of flight operating condition or control command data composed according to aircraft data criterion. The efficiency of the test will be greatly improved by using simulation data composed according to aircraft data criterion, through which any value of any signal and combination of any signals can be provided and the occurrence of certain event can be controlled by people.

Real environment of an aircraft can be fully reproduced by using real data of aircraft condition or control command stored on the airborne QAR (Quick Access Recorder), and the situation where malfunction occurs can be better reproduced. For one problem existing in the art, it is difficult to reproduce malfunction of an aircraft signal transmission device in certain cases. In particular, when each signal transmission device is tested separately, each of the signal transmission devices may work well. However, when multiple signal transmission devices work simultaneously, transmitted signals might be distorted as one signal transmission device might interfere with another, and thus causing malfunction of a signal transmission device. According to one embodiment of the present invention, the test apparatus of the present invention may test multiple aircraft signal transmission devices simultaneously. Especially when QAR data are used, the test apparatus of the present invention can fully reproduce signal environment of an aircraft, and make the occurrence of malfunction possible and create a favorable condition for the location and exclusion of malfunction.

According to one embodiment of the present invention, test data from input interface are connected to simulation signal generation module via a data-based bus system. Those data buses comprise but are not limited to PXI bus, PCI bus, PCIE bus, VXI bus and so forth.

According to one embodiment of the present invention, in order to exactly reproduce signal environment of an aircraft, simulation signal generation portion of the test apparatus of the present invention comprises a simulation signal generation module. The simulation signal generation module generates simulation signals according to the input simulation data of flight operating condition or control command data composed according to aircraft data criterion or data of aircraft condition or control command data from QAR. The type and property of those simulation signals are exactly the same with those of aircraft signals collected by aircraft sensors and data transmitted from other components of aircraft condition.

According to one embodiment of the present invention, simulation signals on the test apparatus of the present invention involve multiple systems of an aircraft, comprising: airframe structure, engine, aviation electronic system, electromechanical system, hydraulic pressure, fuel oil, loop control, manipulation system and so forth. Various types of signals are involved, comprising: analog signal, discrete signal, bus signal exclusive for the use of aviation and so forth; and those signals are interrelated in time and value.

According to one embodiment of the present invention, output interface of the simulation signal generation portion outputs simulation signals generated by simulation signal generation module, and is adaptive to connect simulation signal to an aircraft signal transmission device. Output interface of the simulation signal generation portion comprises output interfaces of multiple types, such as on/off signal output interface, analog signal output interface, bus signal output interface and so forth. According to one embodiment of the present invention, output interface of each type comprises multiple interfaces. As such, the test apparatus of the present invention may test multiple aircraft signal transmission devices simultaneously.

According to one embodiment of the present invention, the simulation signal generation portion further comprises a signal conditioning adapter 213. The signal conditioning adapter further manipulates simulation signals generated by simulation signal generation module, such as amplification or attenuation, isolation, multiplexing and so forth so as to ensure quality and stability of signals and meet the requirement of high accuracy of signals of data of aircraft condition.

As shown in FIG. 2, a signal transmission device to be tested is connected between the simulation signal generation portion 210 and test portion 220 containing DFDAU of the test apparatus 200.

According to one embodiment of the present invention, the test portion of the test apparatus comprises a wiring extension device 221, DFDAU 222 and display and/or printer 224.

According to one embodiment of the present invention, the wiring extension device 221 of the test portion of the test apparatus is used to increase the choice of input so as to form a gating wiring apparatus. According to one embodiment of the present invention, the wiring extension device comprises different zones, with each zone specific to one type of signals. As such, connectors on the wiring extension device for inputting various signals are obvious, easy to manage and convenient for realizing logical combinations of various signals.

Simulation signals generated according to simulation data of flight operating condition or control command data composed according to aircraft data criterion or data of aircraft condition or control command data from QAR are connected to the wiring extension device 221 after passing through the aircraft signal transmission device 201 to be tested. Wiring extension device 221 is directly connected to DFDAU 222. On the other hand, simulation data of flight operating condition or control command data composed according to aircraft data criterion or data of aircraft condition or control command data from QAR also enter into DFDAU via input interface of DFDAU.

According to one embodiment of the present invention, DFDAU of the test portion of the test apparatus of the present invention may be a device of 2233000-8XX produced by Teledyne company, of 967-0212-XXX produced by HoneyWell company, or of 261303879-XXXX produced by Sagem company, wherein, "X . . . " refers to specific types. Persons killed in the art shall appreciate that the above illustrated types are only taken as examples. The test apparatus of the present invention can also use other DFDAU.

In this description, apart from DFDAU produced by the above specific producers, "DFDAU" also comprises apparatus having similar functions. Specifically, DFDAU comprises a data acquisition subsystem, which is used for collecting real-time data of aircraft condition and control signals from each sensor of an aircraft, and converting the obtained data into digital signals. Alternatively, DFDAU also comprises a data processing subsystem, which realizes certain logical processing and output functions according to data of aircraft condition and control signal data obtained by data acquisition subsystem.

According to one embodiment of the present invention, the test portion of the test apparatus comprises a comparison module 223. According to one embodiment of the present invention, comparison module in the test portion of the test apparatus is an independent module separated from the wiring extension device and DFDAU. According to another embodiment of the present invention, the function of comparison module is achieved via software running on DFDAU.

According to one embodiment of the present invention, comparison module 223 compares data of aircraft condition or control signal data (namely, test data loaded from input interface of DFDAU) used by test apparatus for generating simulation signals with data of aircraft condition or control signal data (namely, test data connected from wiring extension device) broadcast by data acquisition subsystem in DFDAU. Whether an aircraft signal transmission device works well can then be determined by comparing whether the above two data are the same.

According to one embodiment of the present invention, since when a message trigger logic is satisfied, ACMS system of DFDAU will issue a corresponding message. Therefore, one can determine whether an aircraft signal transmission device to be tested works well by using the message mechanism of DFDAU, and thus realizing testing the aircraft signal transmission device to be tested.

According to one embodiment the present invention, the test portion of the test apparatus comprises a comparison module, which compares data of aircraft condition or control signal data (namely, test data loaded from input interface of DFDAU) used by test apparatus for generating simulation signals with data of aircraft condition or control command signal (namely, test data connected from wiring extension apparatus) in the message generated by ACMS system. Whether an aircraft signal transmission device works well can then be determined by comparing whether the above two data are the same.

According to one embodiment of the present invention, when multiple data of aircraft condition or control data have to be compared, the comparison module can automatically complete each comparison of data of aircraft condition or control data with data of aircraft condition or control data broadcast by data acquisition subsystem of DFDAU or in a corresponding message, and outputs different data of aircraft condition or control data of the above two to printer and/or display of the test portion of the test apparatus.

According to one embodiment of the present invention, the test apparatus comprises a printer and/or a display. The printer and/or display receive and decode output of DFDAU, and prints and/or displays a message output by DFDAU to be examined and used by operation staff. According to one embodiment of the present invention, printer of the test apparatus is a virtual printer.

According to one embodiment of the present invention, the simulation signal generation portion and test portion of the test apparatus each comprises a power source respectively for providing power to each portion of the test apparatus, such as an alternating current power source of 115 V 400 Hz.

Figure 3:
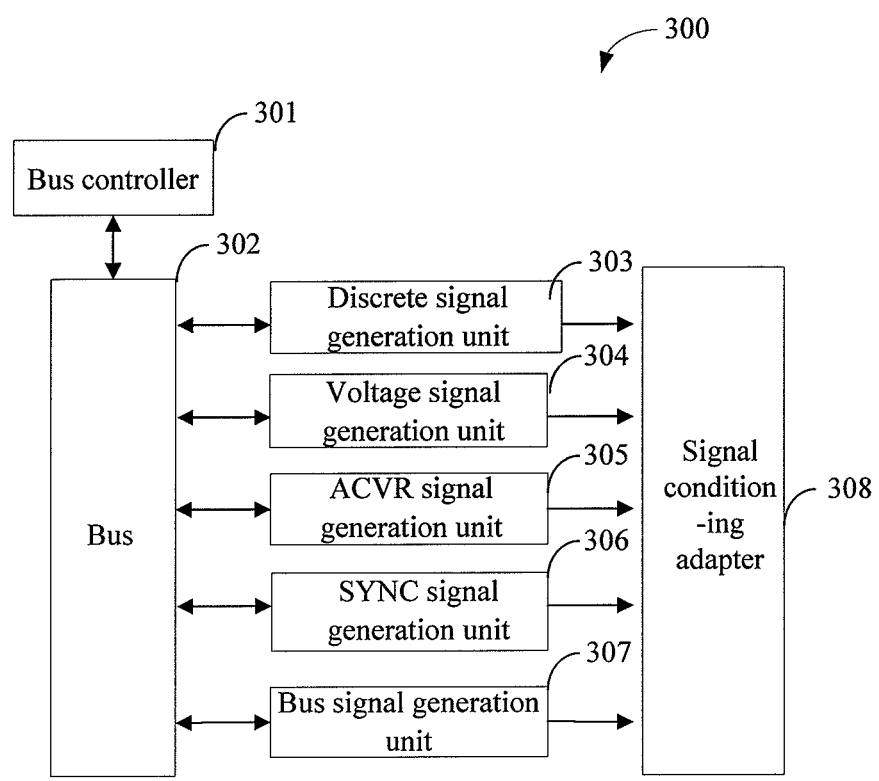
FIG. 3 is a structural schematic of a simulation signal generation module according to one embodiment of the present invention.

FIG. 3 is a structural schematic of a simulation signal generation module according to one embodiment of the present invention. As shown in FIG. 3, simulation signal generation module 300 in the present embodiment integrates multiple simulation signal generation units. According to one embodiment of the present invention, after the input of test data, the test data are connected to each simulation signal generation unit of the simulation signal generation module via data bus system 302 under the control of bus controller 301 in the test apparatus.

According to one embodiment of the present invention, by using the data acquisition processing system with an opening structure of PXI bus, signals are obtained and controlled via various interface boards on the platform of bus technology. Wherein, PXI bus is an opening, modularized instrumental bus with high performance and low cost issued by American National Instruments Company (NI). Persons skilled in the art shall appreciate that PXI bus is described only as an alternative embodiment. Other type of data buses can also be applied in the solutions of the present invention.

According to one embodiment of the present invention, simulation signal generation units integrated in the simulation signal generation module comprise a discrete signal generation unit 303, a voltage signal generation unit 304, n analog signal generation unit and a bus signal generation unit 307.

According to one embodiment of the present invention, the discrete signal generation unit comprises an on/off signal generation unit; the simulation signal generation unit comprises: an alternating current voltage ratio signal ACVR generation unit 305, and a SYNC signal generation unit 306; the bus signal generation unit comprises ARINC429 bus signal generation unit, and ARINC619 bus signal generation unit.

According to one embodiment of the present invention, on/off generation unit comprises high density general purpose relay matrix, which is configured to simulate on/off signals of hundreds of channels, such as high density general purpose single pole single throw relay card. According to one embodiment of the present invention, on/off generation unit comprises digital switch array.

According to one embodiment of the present invention, the voltage signal generation unit comprises a quiescent voltage output board card, simulating LLDC (Low Level Direct Current) signals. According to one embodiment of the present invention, voltage signal generation unit may be PXI-6704 multi-functional quiescent voltage output board card produced by NI Company.

According to one embodiment of the present invention, digital signal generation unit under ARINC429 standard comprises 429 bus board card. According to one embodiment of the present invention, 429 bus board card may be ACX429 produced by AIM Company.

According to one embodiment of the present invention, digital signal generation unit under ARINC619 comprises 619 bus board card. According to one embodiment of the present invention, 619 bus board card may be ACX619 board card produced by AIM Company.

Figure 4:
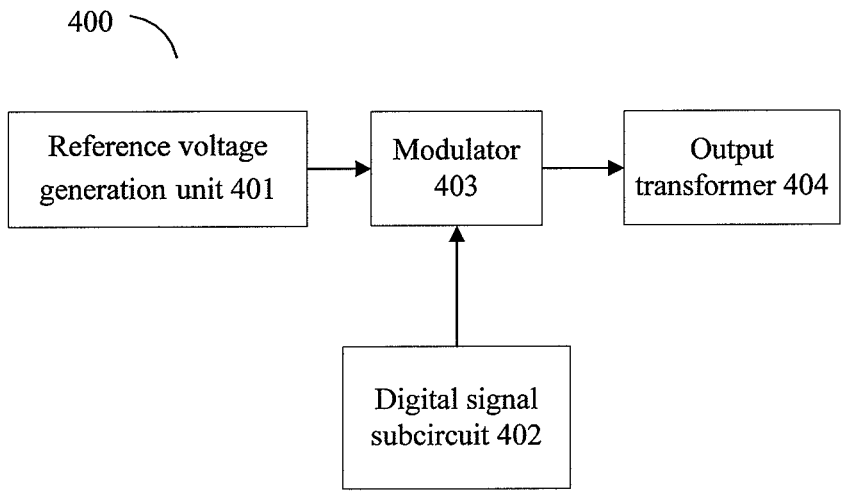
FIG. 4 is a structural schematic of an alternating current voltage ratio ACVR signal generation unit according to one embodiment of the present invention.

FIG. 4 is a structural schematic of an alternating current voltage ratio ACVR signal generation unit according to one embodiment of the present invention. As shown in FIG. 4, ACVR signal generation unit 400 comprises an alternating current voltage signal conversion unit 401, which is connected to a power source to convert an alternating current voltage signal of 115V 400 Hz into a reference alternating current voltage signal of 26V 400 Hz; an digital signal subcircuit 402, which receives digital signals from bus system; a modulator 403 which receives the alternating current voltage signal and the digital signals, and converts the digital signals into alternating current voltage ratio signals; an output transformer 404, which outputs the generated alternating current voltage ratio signal. According to one embodiment of the present invention, the alternating current voltage signal conversion unit 401 generates a required reference alternating current voltage signal after converting frequency and/or voltage of an alternating current voltage signal provided by a power source. According to one embodiment of the present invention, ACVR signal generation unit is a D/V conversion unit from digital signal to alternating current voltage ratio signal.

Figure 5:
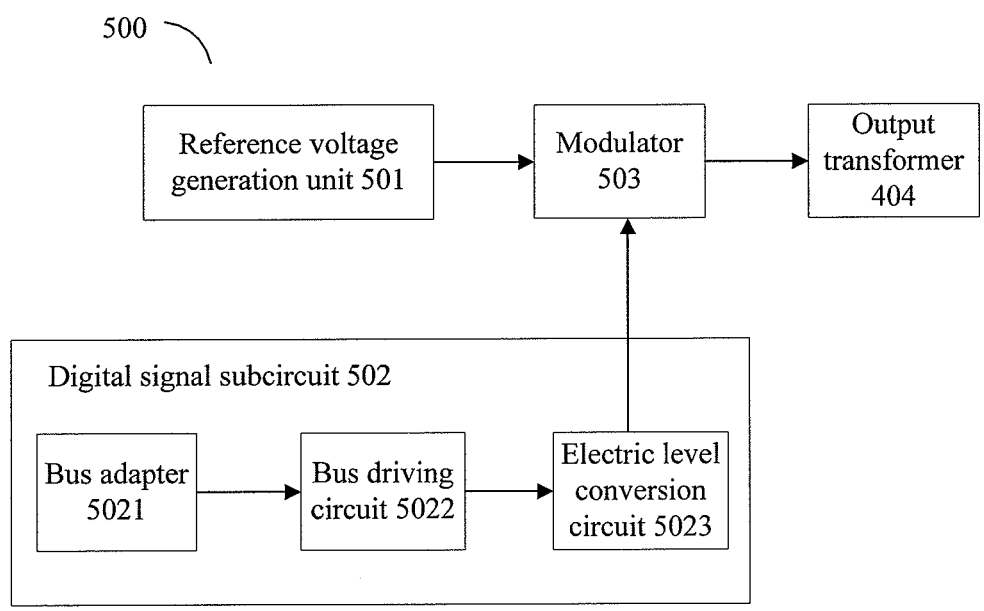
FIG. 5 is a structural schematic of an alternating current voltage ratio ACVR signal generation unit according to another embodiment of the present invention.

FIG. 5 is a structural schematic of an alternating current voltage ratio ACVR signal generation unit according to one embodiment of the present invention. As shown in FIG. 5, ACVR signal generation unit 500 comprises an alternating current voltage signal conversion unit 501, which generates an alternating current voltage signal of 26 V 400 Hz by converting frequency and/or voltage of the alternating current voltage signal of a power source.

ACVR signal generation unit 500 also comprises a digital signal subcircuit 502, a modulator 503, and an output transformer 504. Digital signal subcircuit 502 further comprises a bus adapter 5021, a bus driving circuit 5022 and an electric level conversion circuit 5023. Bus adapter 5021 is connected to an external bus system to obtain digital signals from external bus. Bus driving circuit 5022 is used to drive the digital signals. Electric level conversion circuit 5023 converts the electric level of the digital signals into an electric level required by modulator 503. Modulator 503 receives reference alternating current voltage signal from alternating current voltage signal conversion unit 501, and modulates amplitude of the reference alternating current voltage signals according to digital signals from data bus input by digital signal subcircuit, and generates a corresponding alternating current voltage ratio signal.

Output transformer 504 outputs the alternating current voltage ratio signal.

For example, pressure value of a standby hydraulic pressure of an aircraft is represented by alternating current voltage ratio signal. In order to simulate the signal, modulator 503 modulates reference current voltage signal via the following equation:

$$Up(AC)=26(-0.49E\text{-}5\ Pressure+0.5985);$$

Wherein, Up (AC) is the valid value of an alternating current voltage signal; Pressure is an input pressure value, which is 0-4000 PSI. As such, ACVR signal generation unit 500 may simulate the alternating current voltage ratio signal of the pressure value of a standby hydraulic pressure of an aircraft within the scope 0-4000 PSI.

Figure 6:
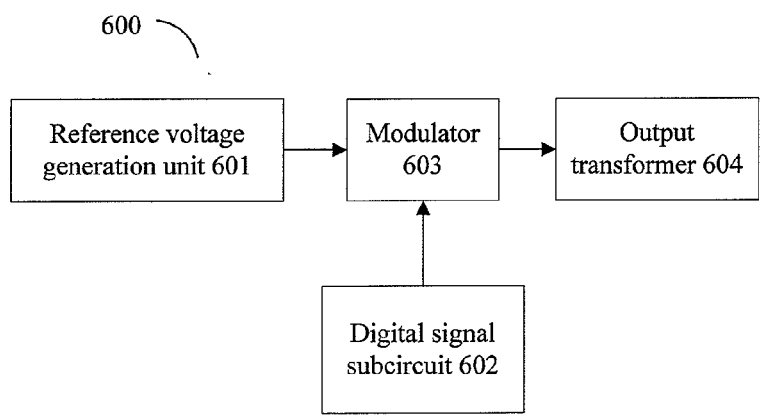
FIG. 6 is a structural schematic of an alternating current voltage sync signal generation unit according to one embodiment of the present invention.

FIG. 6 is a schematic of a sync signal generation unit according to one embodiment of the present invention. Sync signal is also referred to as shaft angle signal. As shown in FIG. 6, sync signal generation unit comprises an alternating current voltage signal conversion unit 601, which is connected to a power source for converting an alternating current voltage signal into the required two sets of reference alternating current voltage sync signals; a digital signal subcircuit 602, which receives digital signal from bus system; a modulator 603 which receives the alternating current voltage sync signal and digital signals and converts the digital signals into alternating current voltage sync signals; and an output transformer 604, which outputs the generated sync signals. According to one embodiment of the present invention, sync signal generation unit is a D/V conversion unit from digital signal to alternating current voltage sync signal.

Figure 7:
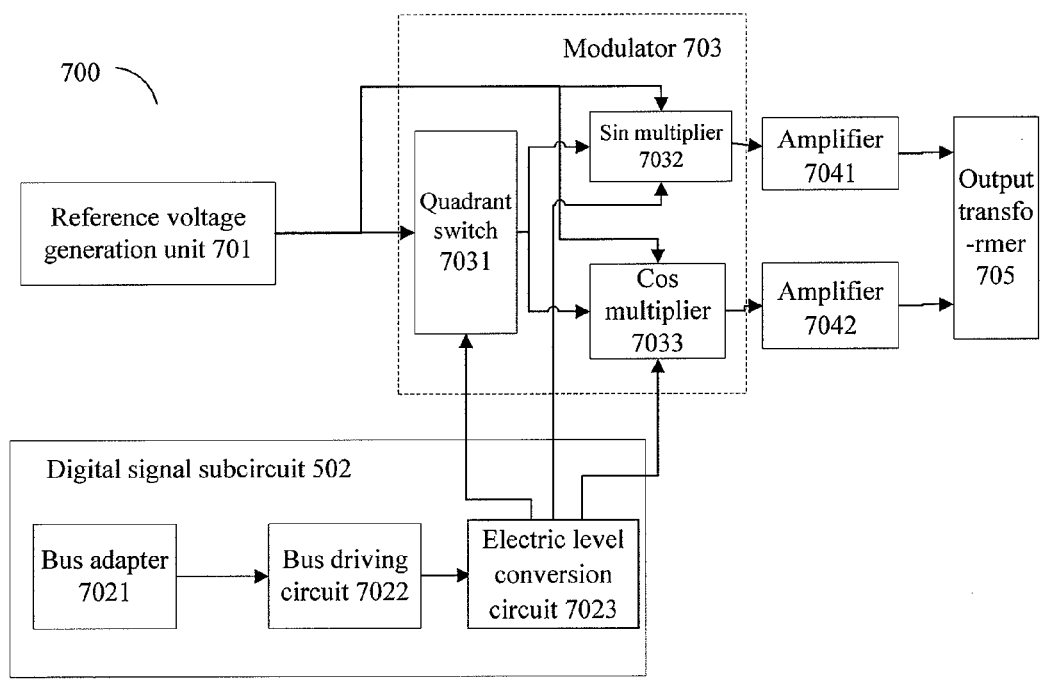
FIG. 7 is a structural schematic of an alternating current voltage sync signal generation unit according to another embodiment of the present invention.

FIG. 7 is a structural schematic of an alternating current voltage sync signal generation unit according to one embodiment of the present invention. As shown in FIG. 7, sync signal generation unit 700 comprises an alternating current voltage signal conversion unit 701, which is connected to a power source for converting the alternating current voltage signal of 115V 400 Hz into two sets of reference alternating current voltage signals of 28V 400 Hz.

Sync signal generation unit 700 also comprises a digital signal subcircuit 702 and a modulator 703. Digital signal subcircuit 702 comprises a bus adapter 7021, a bus driving circuit 7022 and an electric level conversion circuit 7023. Bus adapter 7021 is connected to an external bus system for obtaining digital signals from an external bus. Bus driving circuit 7022 is used to drive the digital signals. Electric level conversion circuit 7023 modulates the electric level of the digital signal into an electric level required by modulator 703.

Modulator 703 of the sync signal generation unit comprises a quadrant switch 7031, a sin multiplier 7032 and a cos multiplier 7033. Two sets of alternating current voltage signals pass through quadrant switch 7031 and enter into sin multiplier 7032 and cos multiplier 7033 respectively. The first two bits of the digital signal from the external bus represent quadrant of the angle, and the rest part represents an angle from 0-90 and thus represents an angle value from 0 to 360. The first two bits of the digital signal are input into quadrant switch 7031, while the rest part is input into sin multiplier 7032 and cos multiplier 7033. After the two sets of alternating current voltage signals pass through sin multiplier 7032 and cos multiplier 7033, the phase difference between the above two signals can represent the angle value.

Sync signal generation unit 700 further comprises amplifiers 7041 and 7042 for amplifying power of the signals output by sin multiplier 7032 and cos multiplier 7033; and an output transformer 705 for outputting the sync signals. As such, shaft angle is simulated.

According to one embodiment of the present invention, the above modulator can be realized via a four-quadrant multiplier.

According to one embodiment of the present invention, wiring extension device of the test portion of the test apparatus comprises a wiring board.

Figure 8:
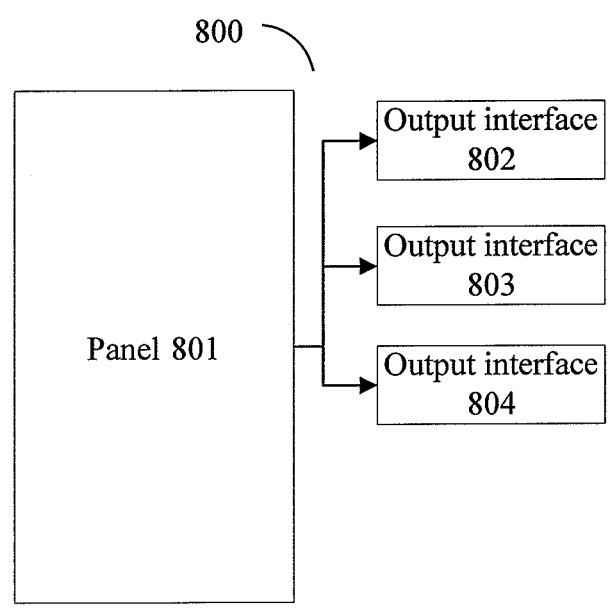
FIG. 8 is a structural schematic of a wiring board according to one embodiment of the present invention'

FIG. 8 is a structural schematic of a wiring board according to one embodiment of the present invention. As shown in the figure, wiring board 800 comprises: a wiring board panel 801 and multiple output interfaces 802-804. According to one embodiment of the present invention, wiring board 801 comprises multiple sockets, with each socket capable of being communicatively connected to an aircraft signal transmission device of a certain type. Each output interface corresponds to one type of signals, and is connected to a corresponding type of input interface of DFDAU. Each output interface comprises multiple output terminals, with each output terminal corresponding to one socket of the wiring board 801.

Figure 9:
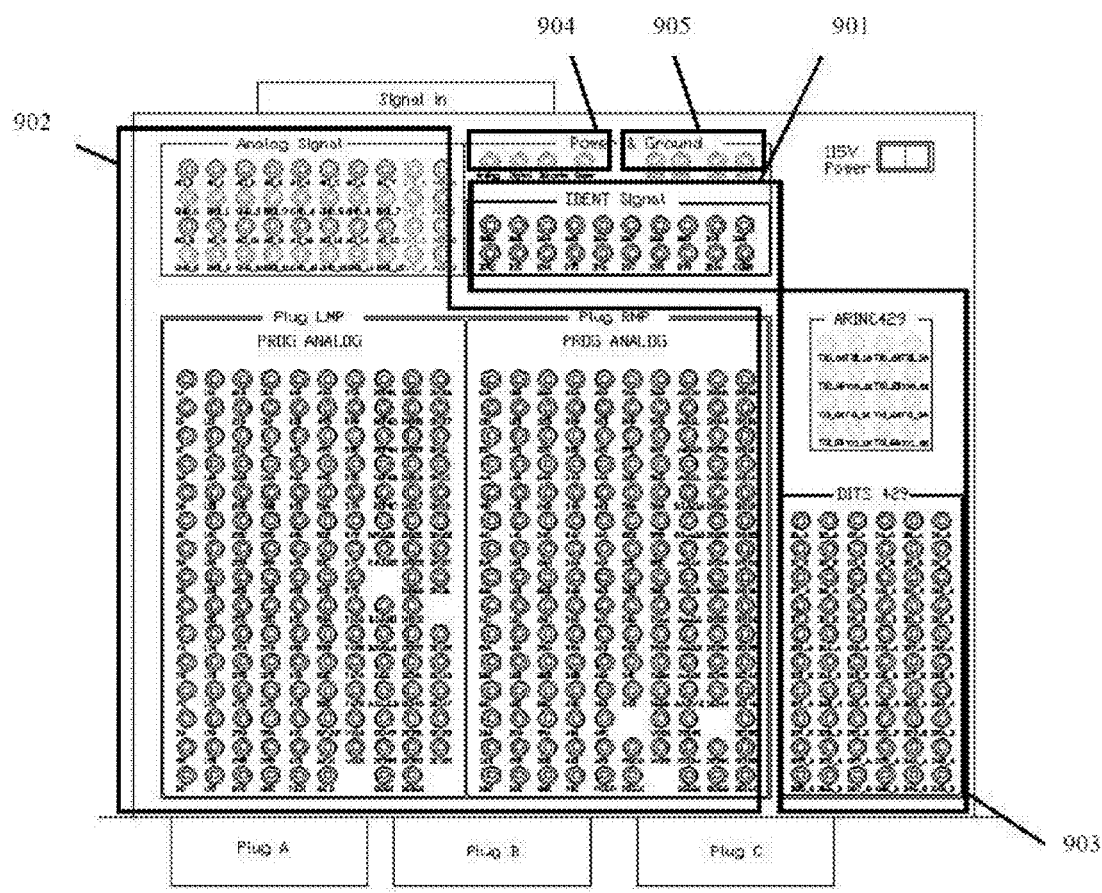
FIG. 9 is a schematic of a wiring board panel according to one embodiment of the present invention.

FIG. 9 is a schematic of a wiring board panel according to one embodiment of the present invention. As shown in FIG. 9, the wiring board panel comprises multiple zones: aircraft type choosing zone 901, analog signal zone 902, and bus signal zone 903. Alternatively, the wiring board panel comprises an on/off signal zone. Aircraft type choosing zone 901 is used to indicate type of an aircraft.

Through allocating different types of signals into different zones, it is convenient for testing personnel to administer the test signals. Besides, test personnel may complete logic combinations of test signals of various types via the wiring board, and simulate situations of collecting data signal of aircraft condition in real environment. The wiring board panel further comprises a power connection zone 904 and a ground connection zone 905.

According to one embodiment of the present invention, the wiring board may alternatively comprise an automatic switchover module. Input signals from wiring board panel 801 are connected to input end of the automatic switchover module, and output end of the automatic switchover module is connected to multiple output interfaces 802-804. Automatic switchover module realizes automatic switchover between each input signal of wiring board panel 801 and each output terminal of multiple output interfaces 802-804. By using automatic switchover module, there is no need for operation staff to manually switch each signal on wiring board panel 801 and the test will become very convenient.

According to another embodiment of the present invention, the wiring extension device comprises an automatic switchover module, an input interface and an output interface. The input interface comprises multiple input terminals, with each input terminal capable of being communicatively connected to an aircraft signal transmission device of a certain type. The output interface comprises multiple output terminals, with each output terminal corresponding to one input terminal of the input interface. The automatic switchover module of the wiring extension device is used for automatic switchover between each input signal on the wiring board panel and each output terminal of the multiple output interfaces.

According to one embodiment of the present invention, the automatic switchover module may comprise a switch matrix arranged in rows and columns. All input signals form each row while all output terminals form each column. There is set a switch at each intersection of each row and column to form a switch array. Automatic switchover between input signal and output terminal can be achieved by controlling those switches in the switch array.

According to one embodiment of the present invention, the wiring board panel alternatively comprises a universal meter module and a circuit scanning module. Since the wiring board comprises numerous connections between input and output ends, those connections may malfunction due to various reasons. It is a tedious and energy-consuming work to examine invalid connections. By measuring current and voltage of connections, the universal meter module may examine whether a connection is invalid. The circuit scanning module may automatically switch between each connection so as to connect the universal meter module to different connections. It is convenient to realize "self-examination" via the universal meter module and circuit scanning module, and to detect all invalid circuits.

In an aircraft, there is provided many signal transmission devices, which are difficult to disassemble or the cost of disassembling is very high. To disassemble the devices without any test will cost much. The test apparatus of the present invention can be miniaturized. The size of the test apparatus after miniaturization is equal to that of a cart or a suitcase. Therefore, it is very convenient to complete the test of a signal transmission device on an aircraft.

Figure 10:
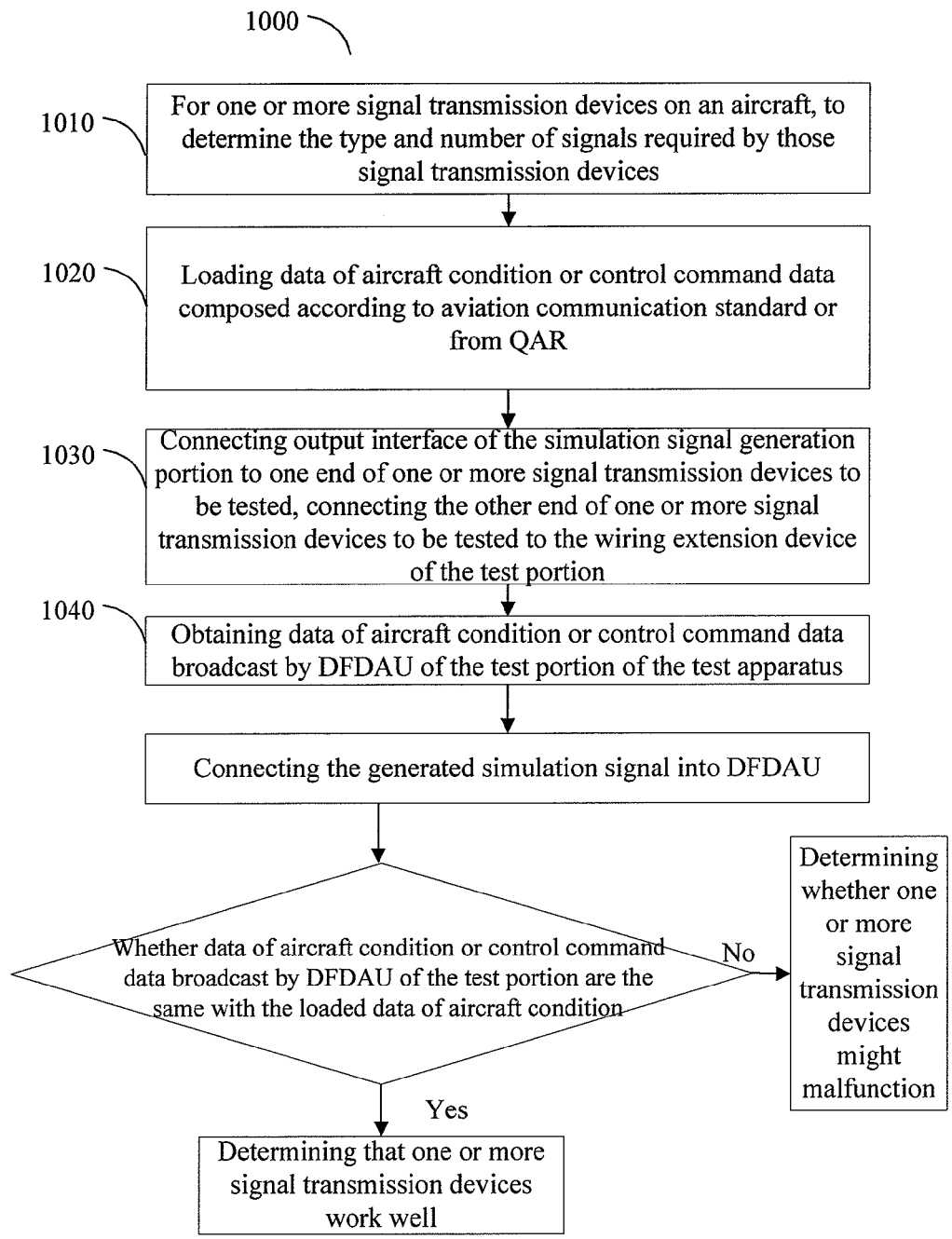
FIG. 10 is a flow chart of a method for testing a signal transmission device according to one embodiment of the present invention.

FIG. 10 is a flow chart of a method for testing an aircraft signal transmission device according to one embodiment of the present invention. As shown in the figure, in the test method 1000, in step 1010, for one or more signal transmission devices on an aircraft, to determine the type and number of signals required by those signal transmission devices; in step 1020, loading data of aircraft condition or control command data composed according to aviation communication standard or from QAR into the test apparatus of the present invention, wherein those data of aircraft condition comprise all data transmitted by the aircraft signal transmission device to be tested; in step 1030, connecting output interface of the simulation signal generation portion of the test apparatus to one end of one or more signal transmission devices to be tested, connecting the other end of one or more signal transmission devices to be tested to the wiring extension device of the test portion of the test apparatus; in step 1040, obtaining data of aircraft condition or control command data broadcast by DFDAU of the test portion of the test apparatus; in step 1050, determining whether data of aircraft condition or control command data broadcast by DFDAU of the test portion of the test apparatus are the same with the loaded data of aircraft condition. If the above two are the same, in step 1060, determining that one or more signal transmission devices work well. Otherwise, in step 1070, that one or more signal transmission devices might malfunction is determined.

Figure 11:
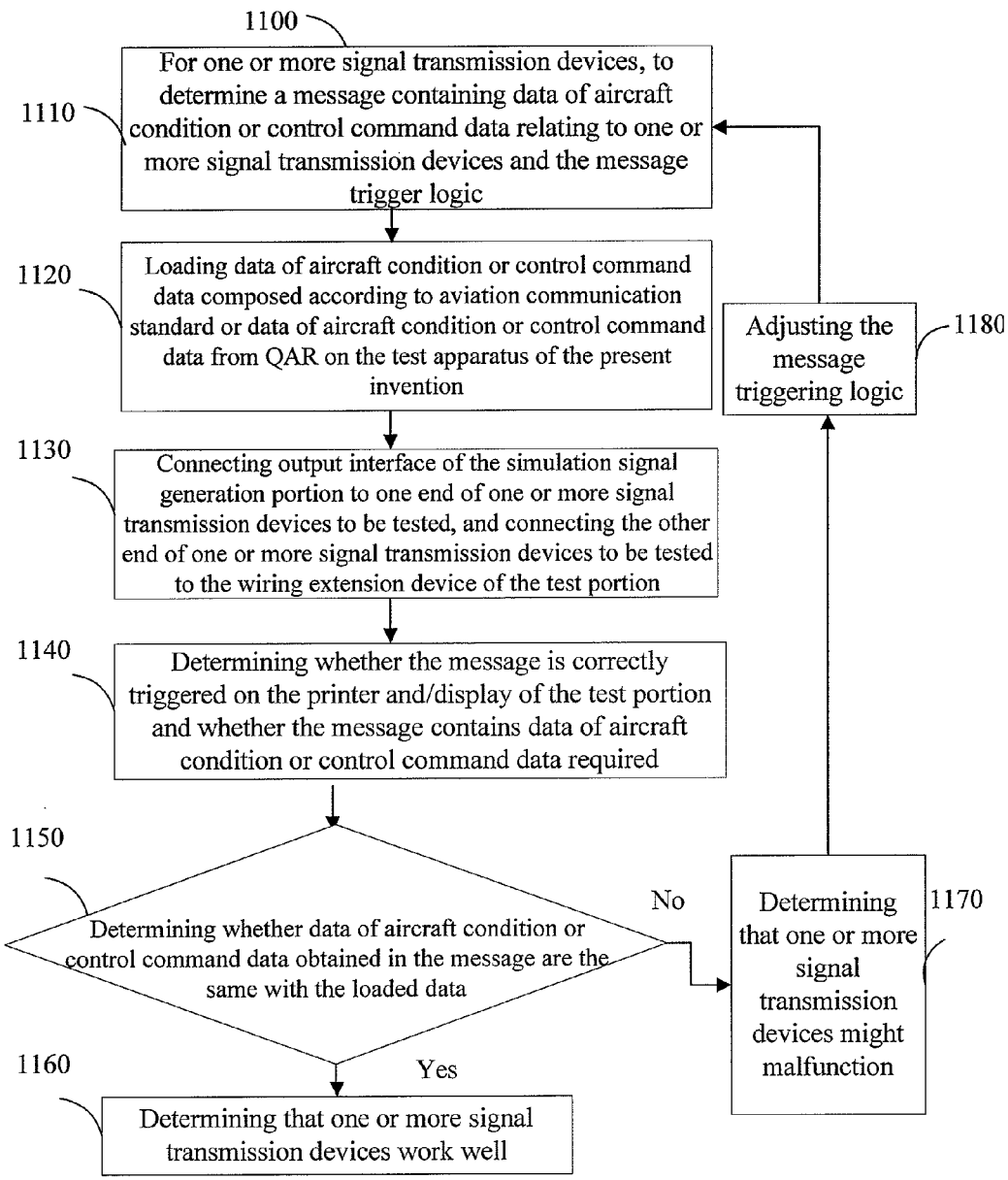
FIG. 11 is a flow chart of a method for testing an aircraft message trigger logic on the test apparatus of the present invention according to one embodiment of the present invention.

FIG. 11 is a flow chart of a method for testing an aircraft signal transmission device according to another embodiment of the present invention. As shown in the figure, in the test method 1000, in step 1110, for one or more signal transmission devices, to determine a message containing data of aircraft condition or control command data relating to one or more signal transmission devices and the message trigger logic; in step 1120, loading data of aircraft condition or control command data composed according to aviation communication standard or data of aircraft condition or control command data from QAR on the test apparatus of the present invention, wherein those data of aircraft condition comprise all data transmitted by the aircraft signal transmission device to be tested; in step 1130, connecting output interface of the simulation signal generation portion of the test apparatus to one end of one or more signal transmission devices to be tested, and connecting the other end of one or more signal transmission devices to be tested to the wiring extension device of the test portion of the test apparatus; in step 1140, determining whether the message is correctly triggered on the printer and/display of the test portion of the test apparatus and whether the message contains data of aircraft condition or control command data required; in step 1150, determining whether the data of aircraft condition or control command data obtained in the message are the same with the loaded data of aircraft condition or control command data. If the above two are the same, in step 1160, that one or more signal transmission devices work well is determined. Otherwise, in step 1170, that one or more signal transmission devices might malfunction is determined. Alternatively, in step 1180, the message trigger logic is adjusted and the above process is repeated.

Figure 12:
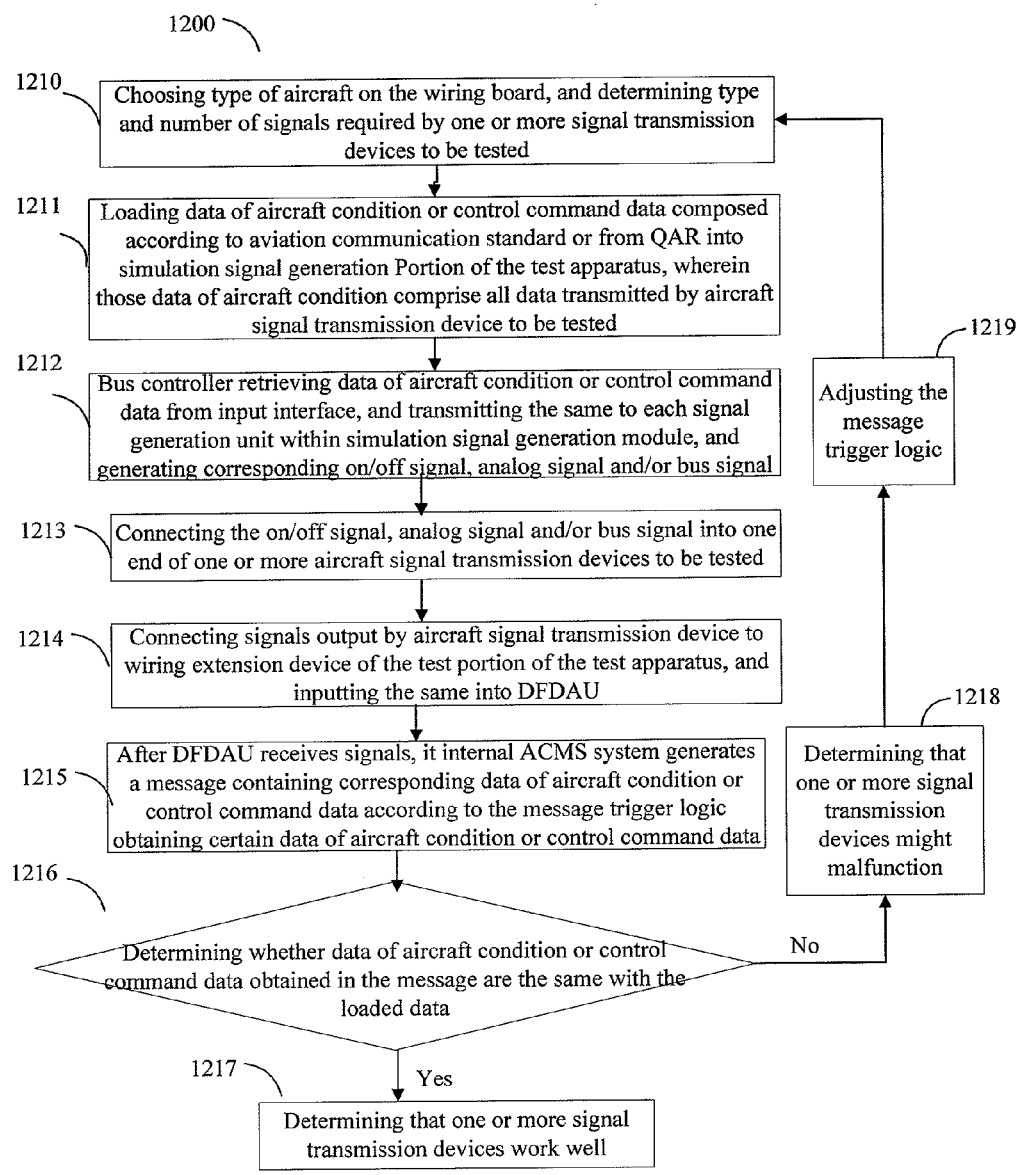
FIG. 12 is a flow chart of a method for testing DFDAU according to one embodiment of the present invention.

FIG. 12 is a flow chart of a method for testing a signal transmission device on the test apparatus of the present invention according to one embodiment of the present invention. As shown in FIG. 12, in test method 1200, in step 1210, choosing type of aircraft on the wiring board, and determining type and number of signals required by one or more signal transmission devices to be tested; in step 1211, loading data of aircraft condition or control command data composed according to aviation communication standard or data of aircraft condition or control command data from QAR into simulation signal generation portion of the test apparatus, wherein those data of aircraft condition comprise all data transmitted by the aircraft signal transmission device to be tested; in step 1212, bus controller retrieving data of aircraft condition or control command data from input interface, and transmitting the same to each signal generation unit within the simulation signal generation module, and generating a corresponding on/off signal, analog signal and/or bus signal; in step 1213, connecting the on/off signal, analog signal and/or bus signal into one end of one or more aircraft signal transmission devices to be tested; in step 1214, connecting signals output by the aircraft signal transmission device to the wiring extension device of the test portion of the test apparatus, and inputting the same into DFDAU; in step 1215, after DFDAU receives signals, its internal ACMS system generates a message containing corresponding data of aircraft condition or control command data according to the message trigger logic obtaining certain data of aircraft condition or control command data; in step 1216, determining whether the data of aircraft condition or control command data obtained in the message are the same with the loaded data of aircraft condition or control command data. If the above two are the same, in step 1217, that one or more signal transmission devices work well is determined. Otherwise, in step 1218, that one or more signal transmission devices might malfunction is determined. Alternatively, in step 1219, the message trigger logic is adjusted and the above process is repeated.

The test apparatus of the present invention fully reproduces data environment of an aircraft. The test result on the test apparatus of the present invention is completely the same with the test result carried out on a real aircraft. Therefore, after being tested on the test apparatus of the present invention, a signal transmission device can be directly applied on an aircraft. The test apparatus and method of the present invention realize the rapid and accurate test of signal transmission devices. Therefore, operation staff can monitor aircraft condition more accurately, ensure flight safety.

Although DFDAU is very important to an aircraft, it is difficult to find any malfunction that occurred when DFDAU process data of aircraft condition or control command data due to a lack of corresponding DFDAU test apparatus. Especially for certain data of aircraft condition or control command data which can only be output on a display or printer after processed by DFDAU, any malfunction when DFDAU processes those data of aircraft condition or control command data can rarely be found. Therefore, there is a need in the art a test apparatus and method specific to DFDAU device.

Figure 13:
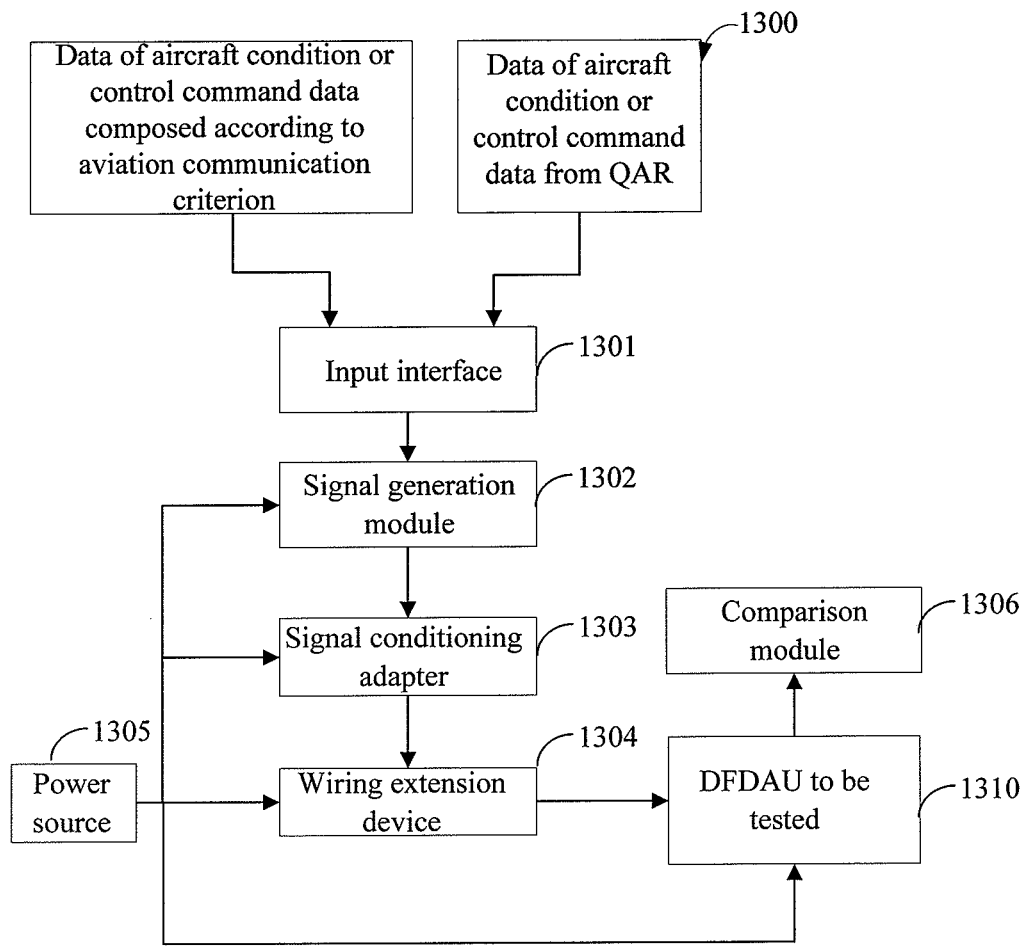
FIG. 13 is a structural schematic of a test apparatus for testing DFDAU according to one embodiment of the present invention.

FIG. 13 is a structural schematic of a test apparatus for testing DFDAU according to one embodiment of the present invention. According to one embodiment of the present invention, the DFDAU that the DFDAU test apparatus may test comprises DFDAU of 2233000-8XX produced by Teledyne Company, of 967-0212-XXX produced by HoneyWell Company, or of 261303879-XXX produced by Sagem, wherein "X . . . " refers to specific types. Persons skilled in the art shall appreciate that the above types are only taken as examples. The test apparatus of the present invention may also be applied in testing other DFDAUs.

As shown in the figure, the test apparatus 1300 of the present invention comprises an input interface 1301 for inputting data of aircraft condition or control command data. According to one embodiment of the present invention, input interface may be wired network interface, USD interface, wireless network interface, Bluetooth interface and so forth. Persons skilled in the art shall appreciate that any means that can realize data input may also be used for configurations of input interface of the test apparatus.

In order to reproduce an exact signal environment of an aircraft, input of the test apparatus of the present invention are simulation signals generated by simulation signal generation module 1302. The type and property of those simulation signals are totally the same with that of aircraft signal collected by aircraft sensors and data from other components of aircraft condition.

According to one embodiment of the present invention, the data source for simulation signals of signal generation module 1302, namely test data, comprises two types: one is simulation data of flight operating condition composed according to aircraft data criterion, and the other is data of aircraft condition or control command data stored on airborne QAR (Quick Access Recorder).

The occurrence of various events can be better simulated and reproduced by using simulation data of flight operating condition composed according to aircraft data criterion. Since the operation of aircraft need high reliability, and the probability of the occurrence of a certain event during the operation of an aircraft is unpredictable, the efficiency of the test will be greatly improved by using simulation data composed according to aircraft data criterion, through which any value of any signal and combinations of any signals can be provided and the occurrence of certain event can be controlled by people.

Situation where malfunction occurs can be better reproduced by using real data of aircraft condition and real data of control command stored in airborne QAR to reproduce real environment of an aircraft.

According to one embodiment of the present invention, simulation signals input into DFDAU on the test apparatus of the present invention involve multiple systems of an aircraft, comprising: airframe structure, engine, aviation electronic system, electromechanical system, hydraulic pressure, fuel oil, loop control, control system and so forth. Various types of signals are involved, comprising: analog signal, discrete signal, bus signal specific to aviation and so forth; and those signals are interrelated in time and value.

According to one embodiment of the present invention, the signal generation module of the present embodiment has identical or similar structure with the above signal generation module. The description with respect to the above signal generation module herein may also be applied to the signal generation module of the present embodiment, and therefore, no more description is repeated here.

According to one embodiment of the present invention, test data are connected to signal generation module through input interface via a data-based bus system. Those data buses comprise but are not limited to PXI bus, PCI bus, PCIE bus, VXI bus and so forth.

According to one embodiment of the present invention, the test apparatus further comprises a signal conditioning adapter 1303. The signal conditioning adapter further manipulates simulation signals generated by signal generation module of the data-based bus system, such as amplification or attenuation, isolating, multiplexing and so forth so as to ensure quality and stability of signals and meet the requirement of high accuracy of signals of data of aircraft condition.

According to one embodiment of the present invention, the test apparatus further comprises a wiring extension device 1304. Before the manipulated signals are input into DFDAU1310, a wiring extension device 1304 is used to increase choices of input so as to form a gating wiring apparatus. According to one embodiment of the present invention, the wiring extension device comprises different zones, with each zone specific to one type of signals. As such, contacts on the wiring extension device for inputting various signals are obvious, easy to control and convenient for realizing logical combination of various signals.

Simulation signals generated by signal generation module are input into the wiring extension device after being manipulated, and then enter into DFDAU 1310 so as to simulate working environment of DFDAU during the operation of an aircraft.

According to one embodiment of the present invention, whether DFDAU works well can be determined by receiving data of aircraft condition or control command data broadcast by data acquisition subsystem of DFDAU and then comparing the same with the input original data, and thus realizing the test of DFDAU.

According to one embodiment the present invention, the test apparatus comprises a comparison module 1306, which compares data of aircraft condition or control command data from input interface of the test apparatus with data of aircraft condition or control command data broadcast by data acquisition subsystem of DFDAU, and outputs the comparison result. According to one embodiment of the present invention, when multiple data of aircraft condition or control command data needed to be compared, comparison module can automatically complete each comparison of data of aircraft condition or control command data from input interface and data of aircraft condition or control command data in the corresponding message, and outputs different data of aircraft condition or control command data of the above two.

According to another embodiment of the present invention, digital signals broadcast by DFDAU are not received directly; instead output data of DFDAU are obtained by analyzing messages issued by DFDAU. Customized messages can be produced by composing ACMS message trigger logics. Customized messages may allow persons skilled in the art get rid of the limitation of parameters in basic messages, and directly deal with thousands of parameters of aircraft condition.

As far as the test of DFDAU is concerned, according to one embodiment of the present invention, a customized message trigger logic is composed according to parameters where problems might occur of DFDAU. After a corresponding message is obtained, whether DFDAU correctly processes data of aircraft condition or control command data can then be determined by comparing data of aircraft condition or control command data in the message with the input data of aircraft condition or control command data.

According to one embodiment the present invention, the test apparatus comprises a comparison module 1306, which compares data of aircraft condition or control command data from input interface of the test apparatus with data of aircraft condition or control command data in the message, and outputs the comparison result. According to one embodiment of the present invention, when multiple data of aircraft condition or control command data needed to be compared, comparison module can automatically complete each comparison of data of aircraft condition or control command data from input interface and data of aircraft condition or control command data in the corresponding message.

According to one embodiment of the present invention, the test apparatus comprises a printer and/or a display. The printer and/or display receives and decodes output of DFDAU, and prints and/or displays output of DFDAU to be examined and used by operation staff. According to one embodiment of the present invention, printer of the test apparatus is a virtual printer.

According to one embodiment of the present invention, the test apparatus further comprises a general printing and/or displaying device, which displays or prints result output by comparison module.

According to one embodiment of the present invention, the simulation signal generation portion and test portion of the test apparatus each comprises a power source 1305 respectively for providing power to each portion of the test apparatus, such as an alternating current power source of 115 V 400 Hz.

Figure 14:
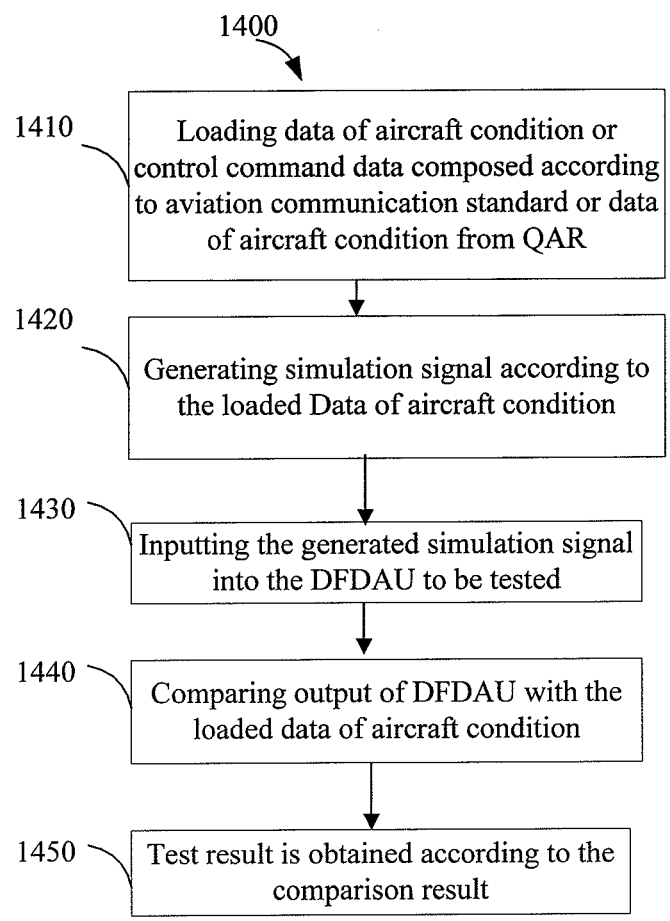
FIG. 14 is a flow chart of a method for testing an aircraft message trigger logic on the test apparatus of the present invention according to one embodiment of the present invention.

FIG. 14 is a flow chart of a method for testing DFDAU according to one embodiment of the present invention. As show in the figure, in the test method 1400, in step 1410, loading data of aircraft condition or control command data composed according to aviation communication standard or data of aircraft condition or control command data from QAR (serving as test data) onto the test apparatus via input interface; in step 1420, according to the loaded test data, simulation signal simulating real operating environment of aircraft are generated by simulation signal generation module; in step 1430, inputting the generated simulation signal into the DFDAU to be tested. According to certain embodiments of the present invention, this step can further comprises manipulating and adapting the simulation signals. According to certain embodiments of the present invention, this step may further comprises manually inputting various signals of DFDAU. In step 1440, data broadcast by DFDAU to be tested and the input test data are compared by the comparison module to see whether they are the same. Or, in step 1450, data in the message issued by DFDAU to be tested and the loaded test data are compared by the comparison module to see whether they are the same. In step 1460, a test result is obtained according to the comparison result.

Figure 15:
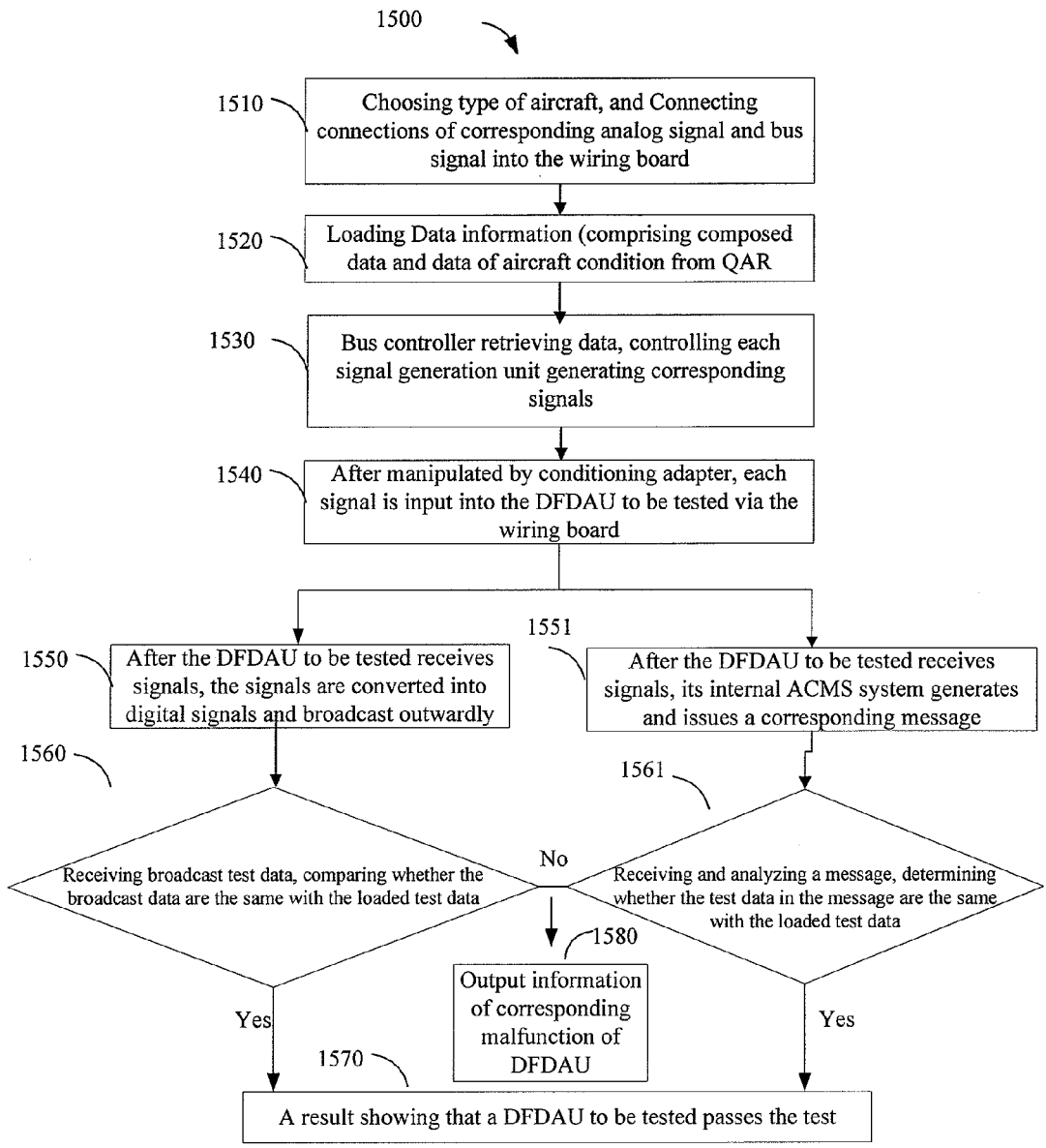
FIG. 15 is a flow chart of a method for testing DFDAU on a testing apparatus of the present invention according to one embodiment of the present invention.

FIG. 15 is a flow chart of a method for testing DFDAU on a test apparatus of the present invention according to one embodiment of the present invention. As shown in FIG. 15, in the test method 1500, in step 1510, choosing type of aircraft on the wiring board, and connections of the required analog signal and bus signal are connected to the wiring board; in step 1520, loading the composed data of aircraft condition or control command data or data of aircraft condition or control command data from QAR; in step 1530, bus controller retrieving data of aircraft condition or control command data from input interface, and transmitting the same to each signal generation unit within simulation signal generation module, and generating a corresponding on/off signal, analog signal and/or bus signal; in step 1540, inputting the signals generated by each signal generation unit into DFDAU to be tested via the wiring board after the signals have been manipulated by conditioning adapter.

In step 1550, after the DFDAU to be tested receives signals, the signals are converted into digital signals and broadcast outwardly. In step 1560, whether data of aircraft condition or control command data broadcast by the DFDAU to be tested are the same with the loaded data of aircraft condition or control command data is determined after the data of aircraft condition or control command broadcast by the DFDAU to be tested are obtained. If they are the same, then go to step 1570 wherein a result showing that the DFDAU to be tested passes the test is obtained; otherwise, in step 1580, output information of corresponding malfunctions of DFDAU.

In step 1551, after the DFDAU to be tested receives signals, its internal ACMS system generates a message containing corresponding data of aircraft condition or control command data according to the message trigger logic obtaining certain data of aircraft condition or control command data. In step 1561, whether data of aircraft condition or control command data obtained in the message are the same with the loaded data of aircraft condition or control command data is determined after the comparison module receives and analyzes the message. If they are the same, then go to step 1570 wherein a result showing that the DFDAU to be tested passes the test is obtained; otherwise, in step 1580, output information of corresponding malfunctions of DFDAU.

The test apparatus of the present invention fully reproduces data environment of an aircraft. The test result on the test apparatus of the present invention is completely the same with the test result carried out on a real aircraft. Therefore, after being tested on the test apparatus of the present invention, the DFDAU can be directly applied on an aircraft. The test apparatus and method of the present invention realize the rapid and accurate test of DFDAU. Therefore, operation staff can monitor aircraft conditions more accurately, ensure flight safety.

The foregoing embodiments are only for illustrative purposes, and not mean to limit scope of the present invention. Persons skilled in relevant art may make various variations and modifications without departing from scope of the present invention. Therefore, all equivalent technical solutions shall fall within scope disclosed by the present invention.

We claim:

1. A test apparatus based on a DFDAU (Digital Flight Data Acquisition Unit), comprising:
    a signal simulation portion;
    a test portion operatively connected to the signal simulation portion;
    wherein the signal simulation portion comprises:
        an input interface, which receives test data,
        a simulation signal generation circuit comprising logic that generates simulation signal according to the test data, and
        an output interface, which is configured to be connected to one end of one or more signal transmission devices to be tested and output the simulation signal;
    wherein, the test portion comprises:
        a wiring extension device, which is used to form a wiring apparatus, and is configured to be connected to the other end of the one or more signal transmission devices to be tested, and receives the simulation signal passing through the one or more signal transmission devices to be tested,
        a DFDAU unit, which is configured to receive simulation signal from the wiring extension device and obtain transmitted test data from the simulation signal, and
        a comparison circuit comprising logic that is configured to compare the test data and obtained transmitted test data to determine whether to test data and obtained transmitted test data are identical.

2. The apparatus of claim 1, wherein the test data comprise data of aircraft condition composed according to aviation communication criterion or control command data.

3. The apparatus of claim 1, wherein the test data comprise data of aircraft condition from QAR (Quick Access Recorder) or control command data.

4. The apparatus of claim 2, wherein the DFDAU converts the simulation signal from the wiring extension device into data of aircraft condition or control command data and broadcasts the data of aircraft condition or control command data; wherein the comparison circuit compares the test data and data of aircraft condition or control command data broadcast by DFDAU.

5. The apparatus of claim 2, wherein the DFDAU converts simulation signal from the wiring extension device into data of aircraft condition or control command data, and generates a message relating to aircraft signal transmission device to be tested according to message trigger logic; wherein the comparison circuit compares the test data and data of aircraft condition or control command data in the message relating to the aircraft signal transmission device to be tested.

6. The apparatus of claim 1, wherein simulation signal generation circuit further comprises a discrete signal generation unit, a voltage signal generation unit, an analog signal generation unit and/or a bus signal generation unit; wherein the input interface is connected to each discrete signal generation unit, voltage signal generation unit, analog signal generation unit and/or bus signal generation unit via a bus system.

7. The apparatus of claim 6, where the discrete signal generation unit comprises an on/off signal generation unit.

8. The apparatus of claim 7, wherein the on/off signal generation unit comprises a relay array or switch array.

9. The apparatus of claim 6, wherein the analog signal generation unit comprises an alternating current voltage ratio (ACVR) generation unit, the ACVR signal generation unit comprises:
    an alternating current voltage signal conversion unit, which is configured to be connected to a power source and generate an alternating current voltage signal with valid value and frequency;
    a digital signal subcircuit, which is configured to receive digital signal;
    a modulator, which is configured to receive the alternating current voltage signal and the digital signal and generate an alternating current voltage ratio signal according to the digital signal; and
    an output transformer, which is configured to output the alternating current voltage ratio signal.

10. The apparatus of claim 9, wherein the digital signal subcircuit comprises:
    a bus adapter, which is connected to the bus system to receive digital signal from the bus system;
    a bus driving circuit, which is used to drive the digital signal; and
    an electric level conversion circuit, which converts electric level of the digital signal into an electric level required by the modulator.

11. The apparatus of claim 9, wherein the modulator modulates valid value of the alternating current voltage signal according to digital signal input from the digital signal subcircuit so as to generate a corresponding alternating current voltage ratio signal.

12. The apparatus of claim 6, wherein the analog signal generation unit comprises a sync signal generation unit, the sync signal generation unit comprises:
    an alternating current voltage signal conversion unit, which is configured to be connected to a power source and generate two sets of alternating current voltage signals;
    a digital signal subcircuit, which is configured to receive input digital signal;
    a modulator, which is configured to convert the two sets of alternating current voltage signals into two sets of alternating current voltage signals having phase difference, wherein the phase difference is based on the digital signal;
    a first and second amplifiers, which are configured to amplify power of the two sets of alternating current voltage signals having phase difference; and
    an output transformer, which is configured to output the amplified two sets of alternating current voltage signals having phase difference.

13. The apparatus of claim 12, wherein the modulator comprises: sin multiplier and cos multiplier; wherein, the two sets of alternating current voltage signals enter into the sin multiplier and the cos multiplier respectively and are converted into two sets of alternating current voltage signals having the phase difference.

14. The apparatus of claim 6, wherein the bus signal generation unit comprises an ARINC429 bus signal generation unit, an ARINC629 bus signal generation unit or a combination thereof.

15. The apparatus of claim 6 further comprises a signal conditioning adapter, which is configured to manipulate simulation signal generated by the signal generation circuit.

16. The apparatus of claim 1, the wiring extension device comprises a wiring board, the wiring board comprises:
    a wiring board panel, which comprises a plurality of sockets, each socket capable of being communicatively connected to one output signal of the simulation signal generation circuit; and
    a plurality of output interfaces, wherein each output interface comprises a plurality of output terminals, each output terminal corresponding to one socket of the wiring board panel;
    wherein according to the type of output interface, each output interface is connected to a corresponding type of input interface of the DFDAU.

17. The apparatus of claim 16, the wiring board panel comprises: an analog signal zone, a bus signal zone, a power connection zone and a ground connection zone.

18. The apparatus of claim 16, the wiring board comprises an automatic switchover circuit comprising logic that is configured to automatically switch between each input signal of the wiring board panel and each output terminal of the plurality of output interfaces.

19. The apparatus of claim 1, wherein the wiring extension device comprises an input interface and an output interface;
    the input interface comprises a plurality of input terminals, each input terminal capable of being communicatively connected to one output signal of the simulation signal generation circuit;
    the output interface comprise a plurality of output terminals, each output terminal corresponding to one socket of the wiring board panel;
    the wiring extension device comprises an automatic switchover circuit comprising logic that is configured to automatically switch between each input terminal of the input interface and each output terminal of the plurality of output interfaces.

20. The apparatus of claim 18, wherein the automatic switchover circuit further comprises a switch array arranged in rows and columns.

21. The apparatus of claim 1, wherein the wiring extension device comprises a wiring board panel comprising:
    a universal meter circuit comprising logic that examines whether a connection is invalid through measuring current and voltage of the connection; and
    a circuit scanning circuit comprising logic that is configured to automatically switch between each connection so as to connect the universal meter circuit to different connections.

22. The apparatus of claim 1, wherein:
    one end of one or more of the signal transmission devices to be tested is connected to the output interface of the simulation signal generation portion of the apparatus, and
    the other end of one or more signal transmission devices is connected to the wiring extension device of the test portion;

wherein:
the test portion is configured to receive additional test data from the one or more signal transmission devices;
the simulation signal generation circuit generates another simulation signal according to the additional test data;
the test portion is configured to receive another simulation signal from the wiring extension device;
the comparison circuit is configured to compare the additional test data from input to input interface and test data based on the another simulation signal from the wiring extension device.

23. The apparatus of claim 22, wherein the test data comprises data of aircraft condition or control command data composed according to aviation communication criterion.

24. The apparatus of claim 22, wherein the test data comprises data of aircraft condition or control command data from aircraft QAR (Quick Access Recorder).

25. The apparatus of claim 23, wherein the DFDAU unit is further configured to convert simulation signal from the wiring extension device into data of aircraft condition or control command data and broadcasts the data of aircraft condition or control command data;
wherein the comparison step comprises: comparing the test data from input to input interface and data of aircraft condition or control command data broadcast by DFDAU.

26. The apparatus of claim 22, wherein the DFDAU unit is further configured to:
convert a simulation signal from the wiring extension device into data of aircraft condition or control command data, and
generate a message relating to aircraft signal transmission device to be tested according to message trigger logic; and
wherein the test portion is further configured to compare the test data from input to input interface and data of aircraft condition or control command data in the message relating to the aircraft signal transmission device to be tested.

* * * * *